United States Patent
Hansen

(10) Patent No.: US 10,077,885 B2
(45) Date of Patent: Sep. 18, 2018

(54) IRIS DIAPHRAGM SYSTEM

(71) Applicant: Martin Professional ApS, Aarhus N (DK)

(72) Inventor: Claus Ellevang Hansen, Hornslet (DK)

(73) Assignee: MARTIN PROFESSIONAL APS, Aarhus (DK)

( * ) Notice: Subject to any disclaimer, the term of this patent is extended or adjusted under 35 U.S.C. 154(b) by 68 days.

(21) Appl. No.: 15/176,096

(22) Filed: Jun. 7, 2016

(65) Prior Publication Data
US 2016/0363289 A1 Dec. 15, 2016

(30) Foreign Application Priority Data
Jun. 15, 2015 (DK) .................. 2015 70366

(51) Int. Cl.
| | |
|---|---|
| *F21V 11/10* | (2006.01) |
| *F21V 14/08* | (2006.01) |
| *G02B 26/02* | (2006.01) |
| *F21V 13/02* | (2006.01) |
| *F21S 10/00* | (2006.01) |
| *F21V 11/14* | (2006.01) |
| *G02B 5/00* | (2006.01) |

(Continued)

(52) U.S. Cl.
CPC ............. *F21V 11/10* (2013.01); *F21S 10/00* (2013.01); *F21V 11/14* (2013.01); *F21V 13/02* (2013.01); *F21V 14/08* (2013.01); *G02B 5/005* (2013.01); *G02B 26/02* (2013.01); *G03B 21/2053* (2013.01); *F21W 2131/406* (2013.01); *F21W 2131/407* (2013.01)

(58) Field of Classification Search
CPC .......... F21V 11/10; F21V 11/14; F21V 11/06; F21V 11/065
USPC ......................................... 362/281
See application file for complete search history.

(56) References Cited

U.S. PATENT DOCUMENTS

| 4,458,303 A | 7/1984 | Berns |
|---|---|---|
| 4,811,182 A * | 3/1989 | Solomon ................... F21V 9/10 353/84 |

(Continued)

FOREIGN PATENT DOCUMENTS

| EP | 0270730 A2 | 6/1988 |
|---|---|---|
| WO | 97/05423 A1 | 2/1997 |
| WO | 2014/031644 A1 | 2/2014 |

OTHER PUBLICATIONS

Danish Search Report Application No. PA 2015 70366, dated Feb. 5, 2016, 2 pages.

(Continued)

*Primary Examiner* — Christopher Raabe
(74) *Attorney, Agent, or Firm* — Artegis Law Group, LLP

(57) ABSTRACT

An iris diaphragm comprises a stationary ring, a rotatable adjusting ring, and a plurality of shutter blades. The plurality of shutter blades forms a diaphragm aperture inside the stationary ring and rotation of the adjusting ring moves the shutter blades inside the stationary ring whereby the size of the diaphragm aperture can be changed. The shutter blades are formed as a flat opaque surface and at least one of the shutter blades comprises at least one transparent region formed in said opaque surface. A light fixture comprises such iris diaphragm arranged between a light source generating a light beam and an optical assembly configured to project the light beam along an optical axis.

15 Claims, 8 Drawing Sheets

(51) Int. Cl.
*G03B 21/20* (2006.01)
*F21W 131/406* (2006.01)
*F21W 131/407* (2006.01)

(56) References Cited

U.S. PATENT DOCUMENTS

| | | | |
|---|---|---|---|
| 4,893,225 A | | 1/1990 | Solomon |
| 5,072,249 A | * | 12/1991 | Yoshida .................. G03B 9/06 396/510 |
| 5,293,542 A | | 3/1994 | Ise et al. |
| 2006/0245184 A1 | | 11/2006 | Galli |
| 2009/0142050 A1 | * | 6/2009 | Kim ........................ G03B 9/28 396/480 |
| 2010/0014291 A1 | * | 1/2010 | Ben Natan ............... F21S 11/00 362/277 |
| 2017/0017135 A1 | * | 1/2017 | Toriumi .................. G03B 9/06 |

OTHER PUBLICATIONS

Extended European Search Report for Ep Application No. 16174170.7, dated Aug. 11, 2016, 10 pages.

* cited by examiner

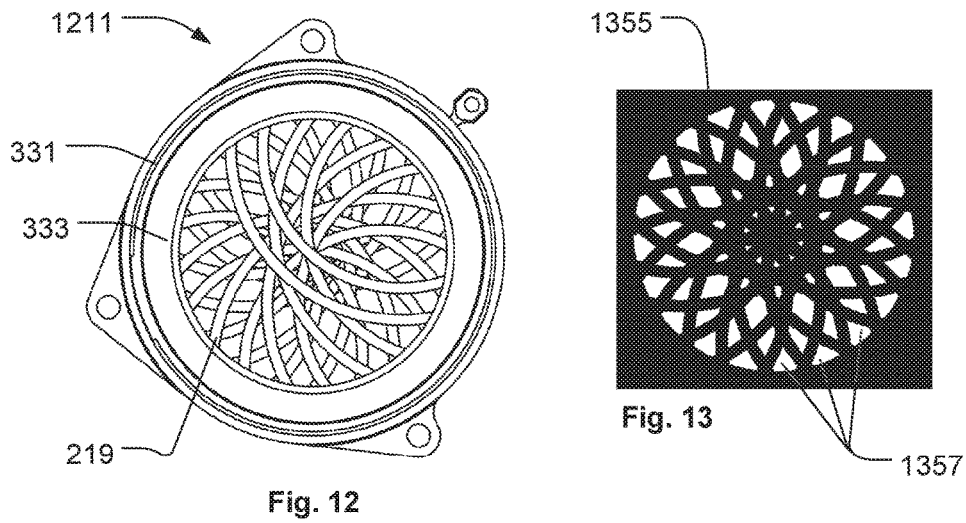
Fig. 12
Fig. 13
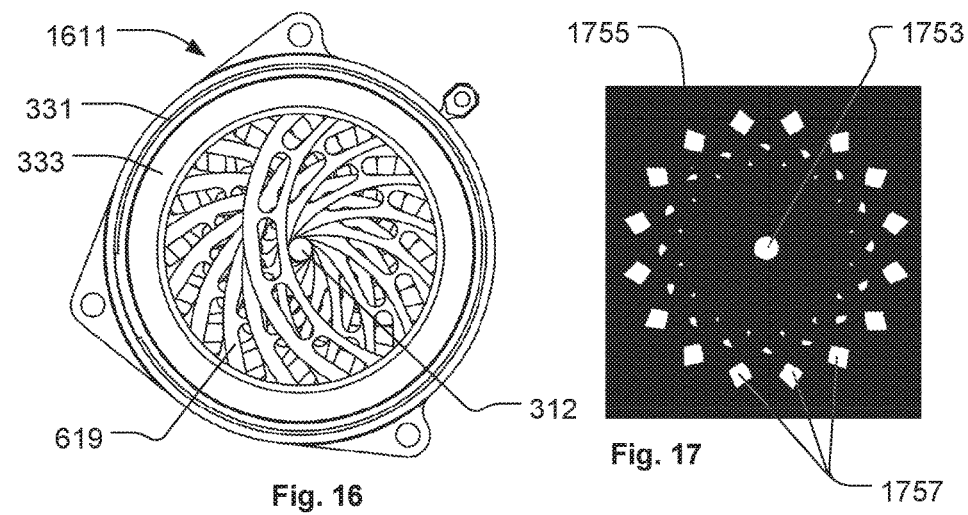
Fig. 16
Fig. 17

IRIS DIAPHRAGM SYSTEM

CROSS-REFERENCE TO RELATED APPLICATIONS

This application claims priority to the Danish patent application titled, "A mechanical iris variant with a dynamic projection pattern in a lighting projection fixture by adding specific patterns in the individual iris blades," filed on Jun. 15, 2015 and having Application No. PA 2015 70366. The subject matter of this related application is hereby incorporated herein by reference.

TECHNICAL FIELD

Various embodiments relate to an iris diaphragm comprising a stationary ring, a rotatable adjusting ring, and a plurality of shutter blades. The plurality of shutter blades forms a diaphragm aperture inside the stationary ring and rotation of the adjusting ring moves the shutter blades inside the stationary ring whereby the size of the diaphragm aperture can be changed. The present invention relates to a light fixture comprising such iris diaphragm which is arranged between a light source generating a light beam and an optical assembly configured to project the light beam along an optical axis.

BACKGROUND

In order to create various light effects and mood lighting in connection with concerts, live shows, TV shows, sport events or as a part of an architectural installation, light fixtures creating various effects are getting more and more used in the entertainment industry. Typically entertainment light fixtures creates a light beam having a beam width and a divergence and can for instance be wash/flood fixtures creating a relatively wide light beam with a uniform light distribution or it can be profile fixtures adapted to project image onto a target surface.

Typically such light fixtures comprises a least one light source generating a light beam propagating along an optical axis and an optical assembly configured to project the light beam along the optical axis. Light fixtures for entertainment can comprise a number of light effect components which is configured to be inserted into the light beam in order to provide different light effects. The light effect components can for instance provide any light effects known in the art of intelligent/entertainments lighting for instance, a CMY color mixing system, color filters, gobos, animation effects wheels, a iris diaphragms, a focus lenses, zoom lenses, prism effect components, framing systems or any other light effects known in the art.

Light designers and programmers typically want as many effects as possible in a light fixture as this give the light designer and programmers many options when creating light shows. Additionally light designers and programmers constantly desire to have new light effects which can be used to create light shows.

US 2011/0063847 discloses a stage lighting fixture with a casing having a closed first end and an open second end; a light source housed inside the casing, close to the first end, to emit a light beam along an optical axis oriented longitudinally with respect to the casing; an objective optical system located along the optical axis, at the second end of the casing, and having a focus position; a circular-aperture diaphragm located along the optical axis, between the light source and the objective optical system, to intercept the beam; and an iris diaphragm located along the optical axis, between the light source and the objective optical system, and which can be set to the focus position. The stage lighting fixture has a first rotary-gobo plate, a fixed-gobo plate, a second rotary-gobo plate, a circular- or polygonal-aperture diaphragm and an iris diaphragm.

SUMMARY

It is an object to provide an advanced light effect system for an entertainment light fixture. The new light effect system is provided by an iris diaphragm as described by the independent claim. The dependent claims describe possible embodiments of the present invention.

BRIEF DESCRIPTION OF THE DRAWINGS

FIG. 12 illustrates a front view of an iris diaphragm comprising 10 of the shutter blades illustrated in FIG. 2;

FIG. 13 illustrates the image created by the iris diaphragm illustrated in FIG. 12;

FIG. 16 illustrates a front view of an iris diaphragm comprising 16 of the shutter blades illustrated in FIG. 6;

FIG. 17 illustrate the image created by the iris diaphragm illustrated in FIG. 16.

DETAILED DESCRIPTION OF EMBODIMENTS

The present invention is described in view of exemplary embodiments only intended to illustrate the principles of the present invention. The skilled person will be able to provide several embodiments within the scope of the claims. In the illustrated embodiments the illustrated light beams and optical means do only serve to illustrate the principles of the invention rather than illustrating exact and precise light beams and optical means. Throughout the description the reference numbers of similar elements providing similar effects have the same last two digits.

Figure 1:
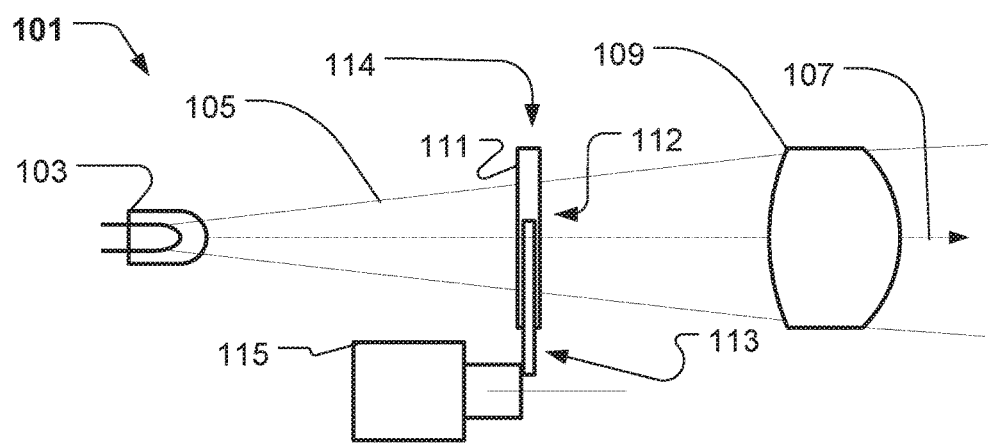
FIG. 1 illustrates a simplified embodiment of the light fixture comprising an iris diaphragm according to the present invention.

FIG. 1 illustrates an embodiment of a light fixture 101 according to the present invention. The light fixture comprises at least one light source 103 generating a light beam 105 propagating along an optical axis 107. The light source can be any known light source for instance incandescent lamps, discharge lamps, plasma lamps, LEDs, OLEDs, PLEDs, etc. or any combination thereof. It is also to be understood that any number of light sources can be used. Additionally the light source(s) can be accompanied by optical components configured to collect light and convert the light into a light beam propagating along the optical axis 107. The optical components can be any optical component capable of modifying the light for instance optical lenses, reflectors, light mixing rods, TIR lenses etc. or combination thereof. It is to be understood that the illustrated light beam only serves to illustrate that the light beam propagates along the optical axis. The light fixture comprises also an optical assembly 109 configured to collect and project at least a part of the light beam along the optical axis. The optical assembly 109 can comprise any kind of optical components. The optical assembly can for instance be used to adjust the beam width and/or diverges of the light beam. The optical assembly can also be configured to create an image of an object point between the light source and the optical assembly at an image point along the optical axis as known in the art of projecting devices. The optical assembly can also comprise optical components for focusing the images at different positions along the optical axis 107.

The light fixture comprises an iris diaphragm system 114 comprising an iris diaphragm 111, an actuator 115 and a coupling linkage 113 connecting the iris diaphragm and the actuator. The iris diaphragm 111 comprises a stationary mount ring, a rotatable adjusting ring, and a plurality of shutter blades (shown in FIG. 2, 6, 9). The plurality of blades forming a diaphragm aperture 112 and the diaphragm aperture is adjustable between a maximum opening and a minimum opening by rotation of the adjusting ring between a maximum opening position and a minimum opening position. The iris diaphragm can be any known iris diaphragm where a plurality of blades are pivotally attached to the stationary ring and where rotation of the adjusting ring causes the blades to pivot around the pivot point and partially move towards the center of the iris diaphragm. FIG. 3a-3c show an exemplary embodiment of an iris diaphragm in further detail, however it is to be understood that other embodiment of the iris diaphragm can be used. It is also to be understood that the blades can have any suitable shape causing the iris aperture to close and open upon rotation of the adjusting ring.

Figure 2:
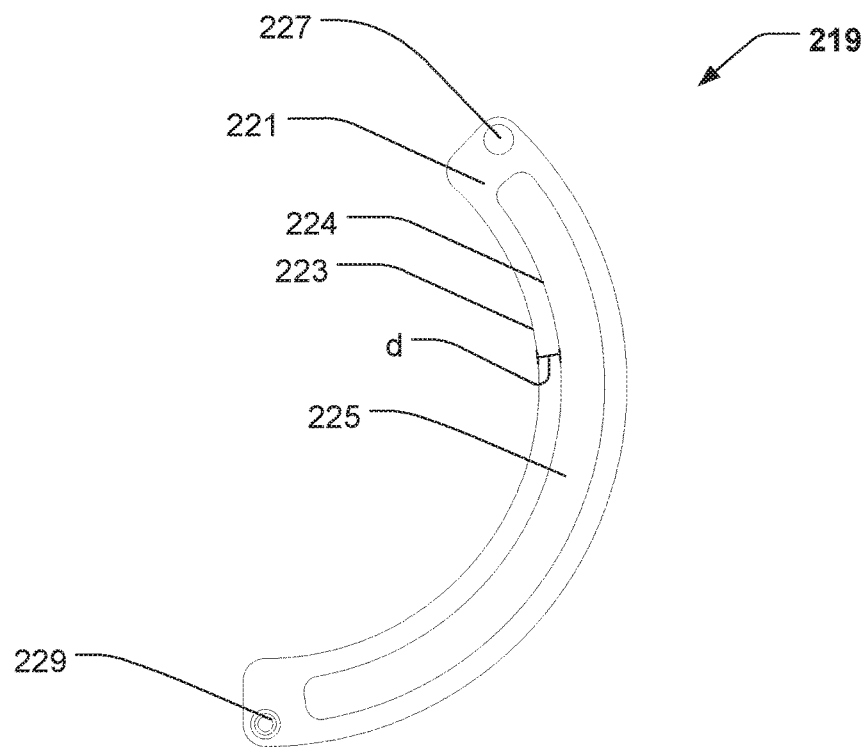
FIG. 2 illustrates a front view of a shutter blade comprising a transparent region according to the present invention.
Figure 3A:
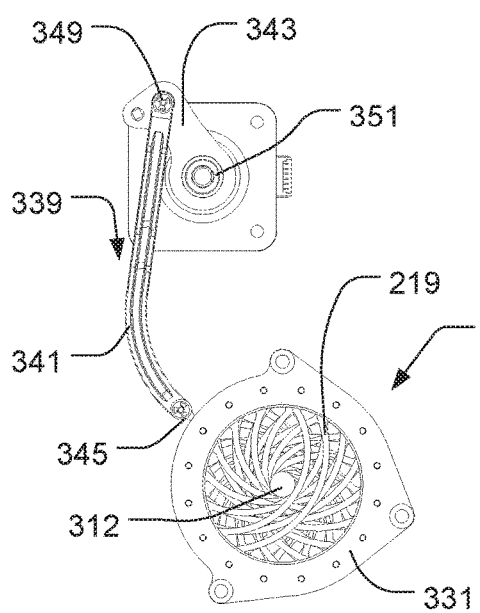
FIG. 3a-3c illustrates an iris diaphragm comprising 16 of the shutter blade illustrated in FIG. 2.
Figure 3B:
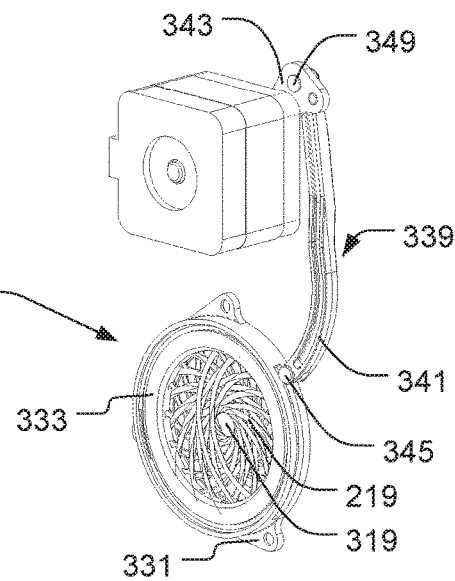
Figure 3C:
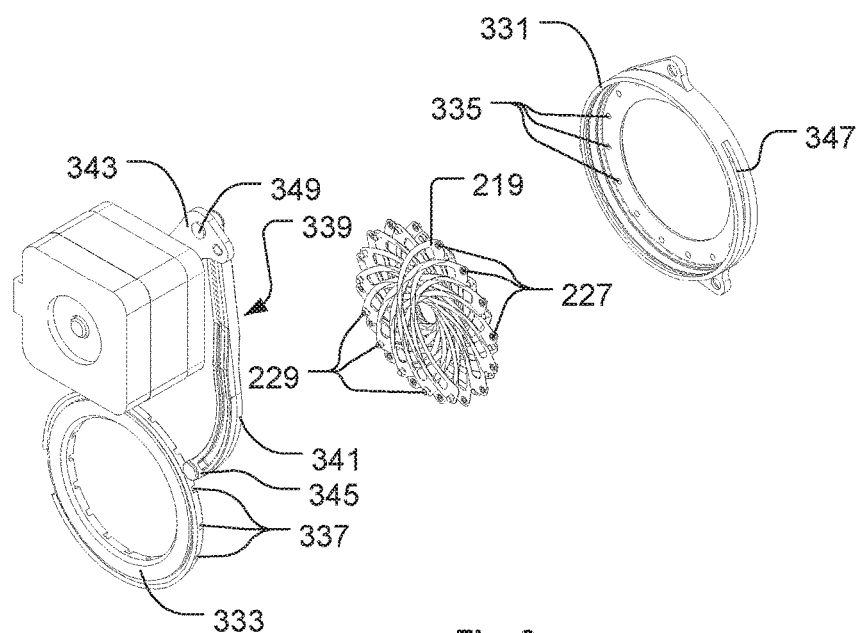

FIG. 2 illustrates a shutter blade used in an iris diaphragm according to an embodiment. The shutter blade 219 is formed as an opaque flat surface 221 comprising a diaphragm edge 223. The diaphragm edge of the shutter blades forms thus an opaque diaphragm edge defining the size of the diaphragm aperture. The opaque flat surface comprises at least one transparent region 225 where through light can pass. The shutter blade 219 comprises a pivot pin 227 which fits into a corresponding pivot hole in the stationary ring enabling the shutter blade to pivot around the center of the pivot hole. The other end of the shutter blade comprises a moving pin 229 which fits into a moving guide in the adjusting ring and which upon rotation of the adjusting ring is forced along the moving guide whereby the shutter blades pivot around the pivot hole and partially moves into the diaphragm aperture. In the illustrated embodiment the pivot pin and the moving pin protrudes from opposite sides of the opaque surface. The transparent region is formed as an oblong region which has substantially the same but smaller shape as the outer contour of the shutter blade. This results in the fact that, when a plurality of such shutter blades is incorporated in the same iris diaphragm, many apertures are created around the diaphragm aperture. In the illustrated embodiment distance d from the diaphragm edge 223 to leading edge 224 of the transparent region is substantially constant. In the illustrated embodiment the transparent region is larger than the flat opaque surface of the shutter blade. In an iris diaphragm comprising a plurality of overlapping shutter blades with transparent regions this will results in the fact the more transparent regions there are the more apertures are created around the iris diaphragm. In other embodiments the area of the transparent region of the shutter blade is more than 25% larger than the area of the area of the opaque surface of the shutter blades.

The transparent region 225 result in the fact that the light can pass through the areas at opaque flat surface 221 whereby light patterns can be created in the normal dark region around the diaphragm aperture and these patterns can be varied by rotating the rotating ring.

The shutter blade can be provided as a metal plate where the transparent region is formed as an opening (cut away) in the metal plate. Alternatively the shutter blades can be provided as a transparent plate e.g. in glass or polymer where the opaque region is provided as a non-transparent coating. It is also possible to provide color filters such as dichroic filters at the transparent regions whereby the color light passing through the transparent regions can be colored according to the color filter.

FIG. 3a-3c illustrate different views of an iris diaphragm system according various embodiments, where FIG. 3a is a back view; FIG. 3b is a front perspective view and FIG. 3c is an exploded view. The iris diaphragm system comprises an iris diaphragm 311 comprising a stationary mount ring 331, a rotatable adjusting ring 333, and a plurality of shutter blades 219. In the illustrated embodiment the iris diaphragm comprises 16 shutter blades 219 however is noticed that the numbered of shutter blades can be varied in order to create various light patterns. The shutter blades are embodied as the shutter blade 219 illustrated in FIG. 2 and identical features have been given the same reference numbers as in FIG. 2. The plurality of shutter blades forming a diaphragm aperture 312 and the diaphragm aperture is adjustable between a maximum opening and a minimum opening by rotation of the adjusting ring between a maximum opening position and a minimum opening position. The plurality of shutter blades 219 are pivotally attached to the stationary ring and rotation of the adjusting ring causes the shutter blades to pivot around the pivot point and partially move towards the center of the diaphragm aperture. In the illustrated embodiment one end of each shutter blade 219 comprise a pivot pin 227 which fits into a corresponding pivot hole 335 in the stationary ring 331. Each shutter blade can thus pivot around the center of the pivot hole. The other end of each shutter blade comprises a moving pin 229 which fits into a moving guide 337 in the adjusting ring 333. The shutter blades 219 and the adjusting ring 333 are arranged inside the stationary ring and the adjusting ring can rotate in relation to the stationary ring. The moving pins of the shutter blades is upon rotation of the adjusting ring forced along the moving guide whereby the shutter blades pivot around the pivot hole and parity moves into the diaphragm aperture.

The diaphragm system comprises coupling linkage 339 comprising a first lever 341 and a second lever 343. The first end of the first lever 341 is connected to the adjustment ring 333 at the connection pin 345. The connection pin 345 extends through an oblong opening 347 in the outer perimeter of the stationary ring. The second end of the first lever 341 is pivotally connected to the first end of the second lever 343 at a pivot point 349. The second lever is fixed to the actuator axel 351 and will rotate around the actuator axel whereby the pivot point 349 revolves around the center of rotation of the actuator axel. By connecting the second end of the first level pivotally to a point revolving around the center of rotation of the actuator axel results in the fact that the first lever is moved in relation to the iris diaphragm. The first end of the first lever will then transform this movement into a rotation of the adjusting ring whereby the shutter blades will move in and out of the diaphragm aperture.

In one embodiment the first lever and the pivot point are mutual arranged such that the adjusting ring rotates in a first rotation direction prior to revolving of the pivot point past the maximum actuator position and such that the adjusting ring rotates in a second rotation direction after revolving of the pivot point past the maximum actuator position. Revolution of the pivot point past the maximum actuator position changes thus the direction of rotation of the adjusting ring. Similar the first lever and the pivot point are mutual arranged such that the adjusting ring rotates in the second rotation direction prior to revolving the pivot point past the minimum actuator position and such that the adjusting ring rotates in the first rotation direction after revolving the pivot point past the minimum actuator position.

Additionally the first lever 341 comprises a curved part which makes it possible to ensure that the first lever does not move into the iris diaphragm and makes it possible to arrange the rotation actuator and iris diaphragm in a more close arrangement. The curved part can in one embodiment be provided such that it has substantially the same curvature as the outer perimeter of the iris diaphragm.

It is noticed that other coupling linkages between the actuator and the iris diaphragm can be provided. For instance coupling linkages, which require to actuator to alternate the direction of rotation in order to open and close the iris diaphragm aperture.

The illustrated embodiment of the iris diaphragm system only serves to illustrate one example of an iris diaphragm system where the shutter blades are arranged to provide a variable diaphragm aperture and where transparent regions of the shutter blades form a number of apertures around the diaphragm aperture. It is noticed that an iris diaphragm with a shutter blade comprising flat opaque surface having at least one transparent region can be provided by using any traditional iris diaphragm system by replacing at least one the fully opaque shutter blades with a shutter blade having a transparent region.

The diaphragm system 311 illustrated in FIGS. 3a-3c comprises 16 of the shutter blades illustrated in FIG. 2. By providing a plurality of shutter blades having identical transparent regions in the opaque flat surface results in the fact the light patterns created around the diaphragm aperture has a regular patter which has an esthetic good appearance when used to create light effects. This is achieved as the shutter blades moves simultaneously and the identical transparent regions forms apertures around the diaphragm aperture in regular pattern.

FIG. 4a-4d illustrates front views of the iris diaphragm of FIG. 3a-3c in different settings and FIG. 5a-5d illustrate images created by the iris diaphragm of a corresponding setting. The images can be created by projecting an image of the diaphragm onto a target surface using an optical assembly as described in connection with FIG. 1.

Figure 4A:
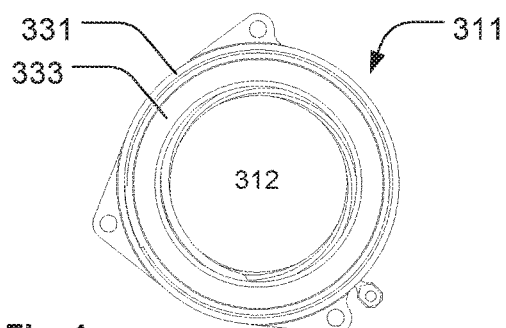
FIG. 4a-4d illustrates front views of the iris diaphragm in FIG. 3a-3c at different settings.
Figure 5A:
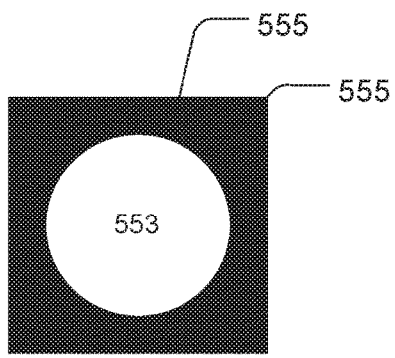
FIG. 5a-5d illustrate images created by the iris diaphragm at the different settings illustrated in FIG. 4a-4d.

FIG. 4a illustrates the iris diaphragm in the maximum open position where the shutter blades are arranged along the peripheral edges of the stationary ring and the adjusting ring and where the largest diaphragm opening are formed. The corresponding image are shown in FIG. 5a and illustrates a central circular bright 553 spot surrounded by a dark area 555.

Figure 4B:
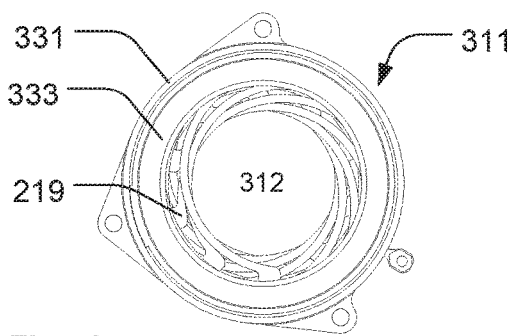
Figure 5B:
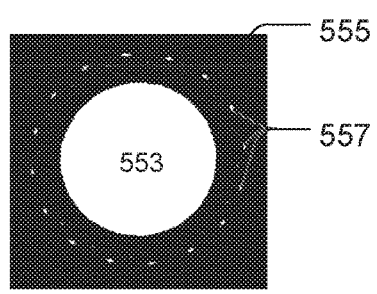

FIG. 4b illustrates the iris diaphragm in a setting where compared to the setting illustrated in FIG. 4a the adjusting ring has been rotated in relation to the stationary ring and the shutter blades has pivoted into to the opening of the stationary and adjusting ring. As a consequence the size of the diaphragm opening 312 has been reduced. The corresponding image is shown in FIG. 5b and illustrates a central circular bright spot 553 surrounded by a dark area 555 where a plurality of peripheral bright spots 557 have been created around the central circular bright spot. The plurality of peripheral bright spots 557 forms a peripheral light pattern around the central bright spot. The plurality of peripheral bright spots is formed due to the fact the transparent regions of the shutter blades 229 overlaps and forms apertures in the area surrounding the diaphragm aperture.

Figure 4C:
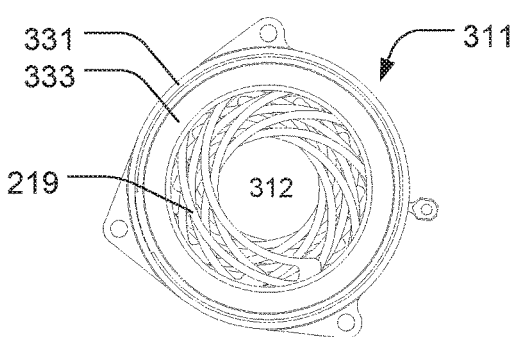
Figure 5C:
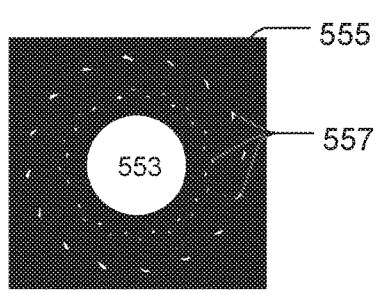

FIG. 4c illustrates the iris diaphragm in a setting where compared to the settings illustrated in FIGS. 4a and 4b the adjusting ring has been rotated further in relation to the stationary ring and the shutter blades has pivoted further into to the opening of the stationary and adjusting ring. As a consequence the size of the diaphragm opening 312 has been further reduced. The corresponding image is shown in FIG. 5c and illustrates that the size of the central circular bright spot 553 has been reduced and the peripheral light pattern has changed.

Figure 4D:
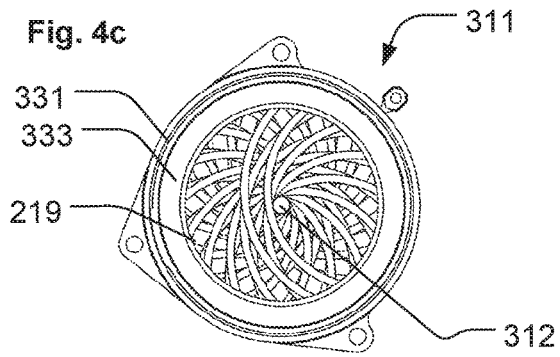
Figure 5D:
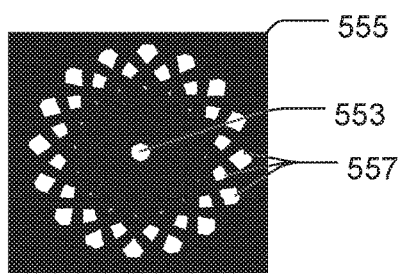

FIG. 4d illustrates the iris diaphragm in a setting where compared to the setting illustrated in FIGS. 4a-4c the adjusting ring has been rotated even more in relation to the stationary ring and the shutter blades has pivoted further into to the opening of the stationary and adjusting ring. As a consequence the size of the diaphragm opening 312 has been reduced even more. The corresponding image is shown in FIG. 5d and illustrates that the size of the central circular bright spot 553 has been reduced and the peripheral light pattern has changed.

FIGS. 4a-4b and FIGS. 5a-5c illustrate that a new light effect can be created by the iris diaphragm according to various embodiments as it is possible to provide peripheral light patterns around the central opening formed by the diaphragm edge of the shutter blades. It is to be understood that many more peripheral light patterns can be created as the adjusting ring and stationary ring can be arrange in a large number of positions in relation to each other whereby the shutter blades also can be arranged in a large number of positions resulting in the fact that a large number of peripheral light patterns can be created. It is further to be understood that the adjusting ring and stationary ring continuously can be moved in relation to each other resulting in the fact the central circular bright spot dynamically changes size and the peripheral light patterns changes dynamically.

Figure 6:
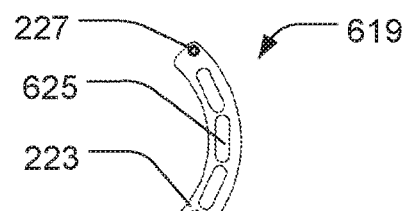
FIG. 6 illustrates a front view of another shutter blade comprising a plurality of transparent regions.

FIG. 6 illustrates another embodiment of a shutter blade used in an iris diaphragm according to various embodiments. The shutter blade is similar to the shutter blade illustrated in FIG. 2 and similar elements have been given the same reference numbers. In this embodiment a plurality of transparent regions 625 have been formed in the flat opaque surface 221. The plurality of transparent are formed as oblong shapes, however it is noticed that the transparent regions can be formed in any arbitrary shape.

Figure 7A:
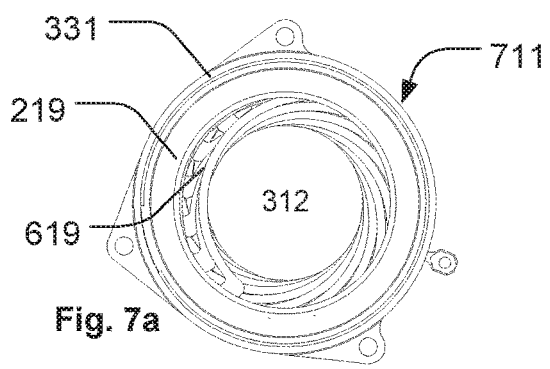
FIG. 7a-7c illustrate front views of an iris diaphragm comprising 10 of the shutter blade illustrated in FIG. 6.
Figure 8A:
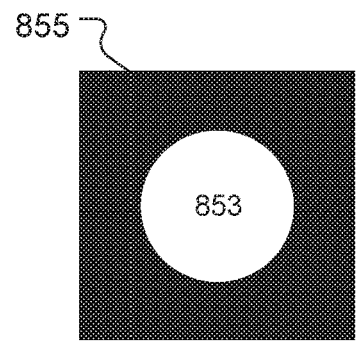
FIG. 8a-8c illustrate images created by the iris diaphragm at the different settings illustrated in FIG. 7a-7d.
Figure 7B:
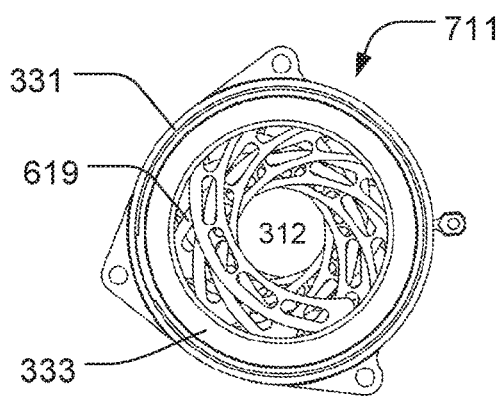
Figure 8B:
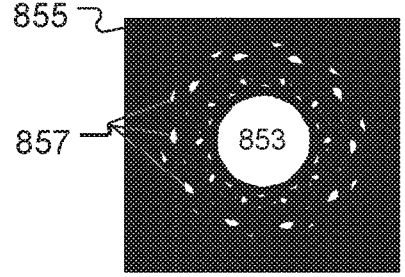
Figure 7C:
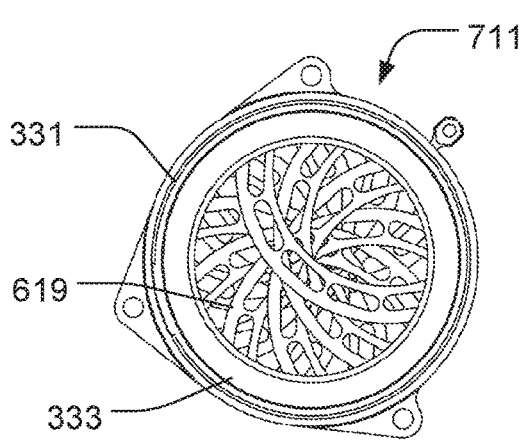
Figure 8C:
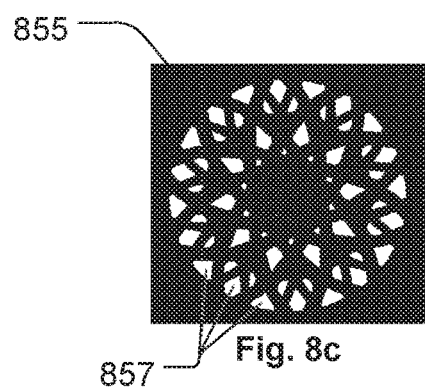

FIG. 7a-7c illustrates front views of another an iris diaphragm 711 with 10 of the shutter blade shown in FIG. 6 in different settings and FIGS. 8a-8c illustrate images created by the iris diaphragm at a corresponding setting. Comparing the corresponding images of the similar settings having substantial the same diaphragm aperture of the previous or the following figures shows that the peripheral light pattern 857 can be designed by changing the size, shape and number of transparent regions at the shutter blades.

In the illustrated embodiment the shutter blades have been arrange in different layers and it is thus possible to move the shutter blades into a position (illustrated in FIGS. 7c and 8c) where the diaphragm aperture 312 is completely closed and where the central bright spot 553 is missing.

In alternatively embodiments the shutter blades can be arranged in a merged setting where the shutter blades are merged into each other such that the first shutter blade is arranged below the second shutter blade, and the second shutter blade are arranged below the third shutter blade and so on until the last shutter blade, which is arranged below the first shutter blade. Thus each shutter blade are arranged below at least one neighboring shutter blade and above at least another neighboring shutter blade. As a consequence the shutter blades are forced into nearly the same plane which makes it possible to provide a very sharp image of the pattern formed by the shutter blades. One disadvantage of arranging the shutter blades in a merged setting is the fact that the shutter blades cannot be arranged in a setting where the diaphragm aperture is fully closed. It is noticed the iris diaphragm according to various embodiments can be provided with the shutter blades in different layers and in a merged setting or combinations thereof.

Figure 9:
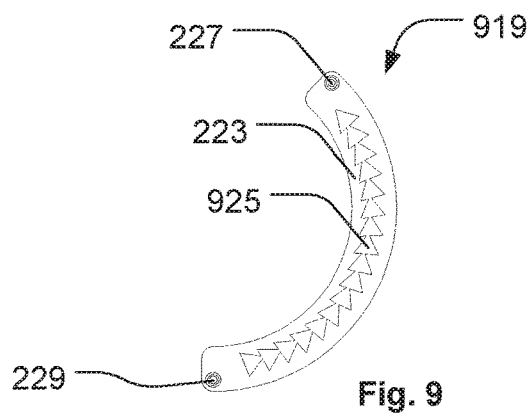
FIG. 9 illustrates a front view of another shutter blade comprising transparent region having another form.

FIG. 9 illustrates another embodiment of a shutter blade 919 according to various embodiments. The shutter blade is similar to the shutter blade illustrated in FIG. 2 and similar elements have been given the same reference numbers. In this embodiment the transparent region has been formed as a scalloped oblong pattern.

Figure 10A:
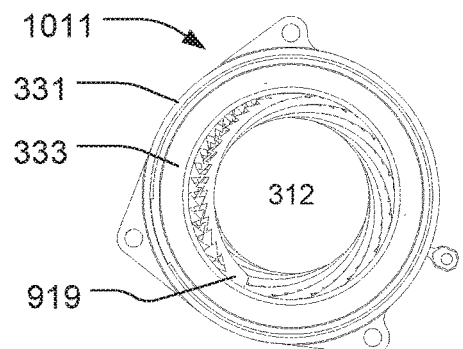
FIG. 10a-10c illustrate front views of an iris diaphragm comprising 16 of the shutter blades illustrated in FIG. 9.
Figure 11A:
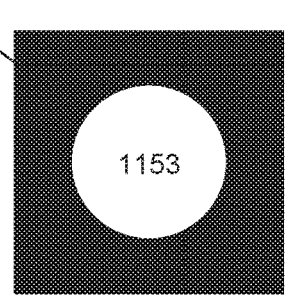
FIG. 11a-11c illustrate images created by the iris diaphragm at the different settings illustrated in FIG. 7a-7d.
Figure 10B:
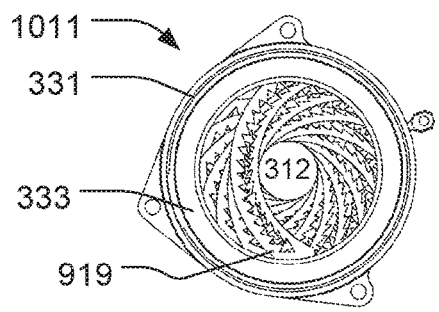
Figure 11B:
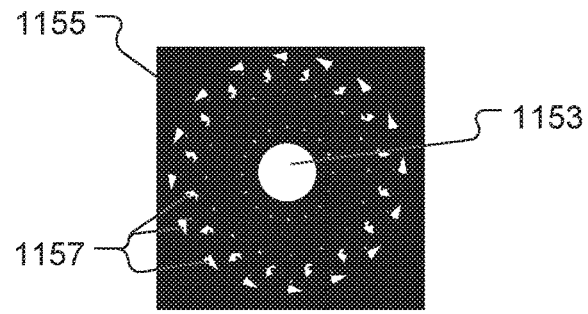
Figure 10C:
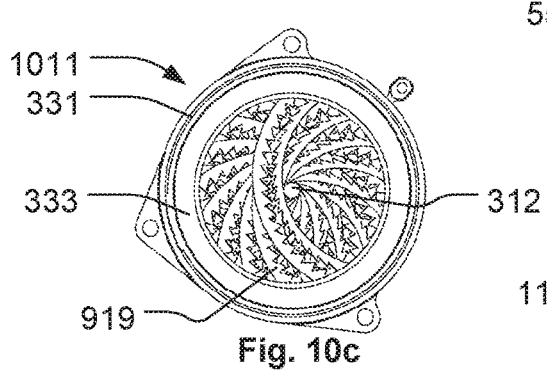
Figure 11C:
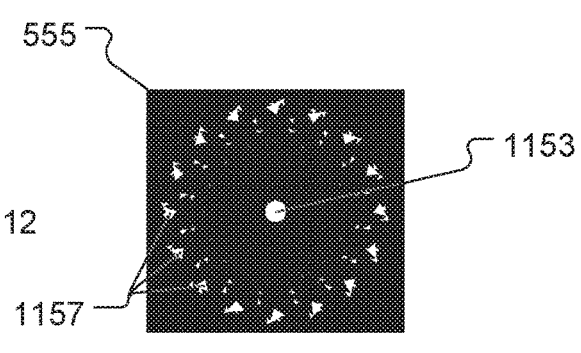

FIG. 10a-10c illustrates front views of an iris diaphragm 1011 with 16 of the shutter blade shown in FIG. 9 in different settings and FIGS. 11a-11c illustrate images created by the iris diaphragm at a corresponding setting. Comparing the corresponding images of the similar settings having substantial the same diaphragm aperture of the previous or the following figures shows that the peripheral light pattern 1157 can be designed by changing the size, shape and number of transparent regions at the shutter blades FIG. 12 illustrates a front view of another an iris diaphragm 1211 with 10 of the shutter blades shown in FIG. 2 in a closed setting and FIG. 13 illustrates the corresponding image. Comparing this image with image of the nearly same setting of the iris diaphragm illustrated 311 in FIG. 5d shows that peripheral light pattern 1337 changes when the number of shutter blades changes.

FIG. 16 illustrates front views of another an iris diaphragm 1611 with 16 of the shutter blades shown in FIG. 6 in a closed setting and FIG. 17 illustrates the corresponding image. Comparing this image with image of the same setting of the iris diaphragm illustrated 711 in FIG. 8c shows that peripheral light pattern 1757 changes when the number of shutter blades changes.

In the previous figures the iris diaphragms has been illustrated as having a plurality of shutter blades with identical transparent regions, however it is to be noticed the shutter blades having different transparent regions also can be provided in the same iris diaphragm. For instance in order to provide different peripheral light patterns around the central bright spot. In one embodiment a number of shutter blades with different shaped transparent regions can be provided in an alternating pattern. For instance two kinds of shutter blades having different transparent regions can be provided such that the kind of shutter blades changes every second shutter blade. Additional it is also noticed that the outer control of the plurality of shutter blades can be different.

Figure 14:
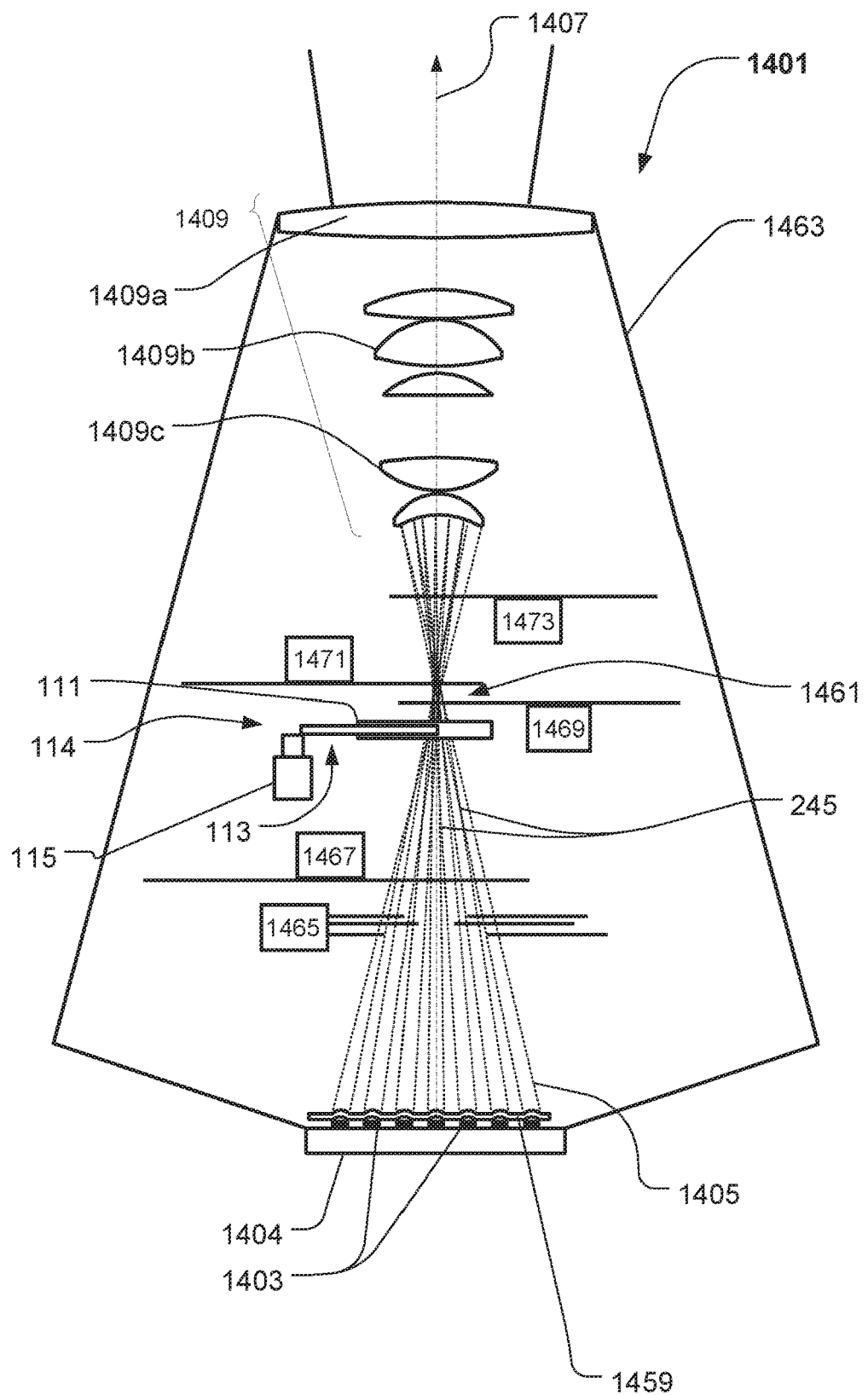
FIG. 14 illustrates a structural diagram of a light fixture comprising a iris diaphragm according to various embodiments.

FIG. 14 illustrates a structural diagram of a light fixture 1401 comprising an iris diaphragm system 114 according to various embodiments. The iris diaphragm system 1414 is similar to the iris diaphragms shown in the previous figures and will not be described in further details.

The light fixture comprises a plurality of light sources 1403 formed as LEDs arranged on a heat sink 14304, a light collector 1459, an optical gate 1461 and an optical assembly 1409. The light sources and heat sink are arranged at the bottom part of a lamp housing 1463 of the light fixture and the other components are arranged inside the lamp housing 1463. The light collector 1459 is adapted to collect light from the LEDs 1403 and to convert the collected light into a plurality of light beams 1405 (dotted lines) propagating along the optical axis 1407 (dash-dotted line). The light collector can be embodied as any optical means capable of collecting at least a part of the light emitted by the LEDs and convert the collected light to a light beam. In the illustrated embodiment the light collector comprises a number of lenslets each collecting light from one of the LEDs and converting the light into a corresponding light beam. However it is noticed that the light collector also can be embodied as single optical lens, a Fresnel lens, a number of TIR lenses (total reflection lenses), a number of light rods etc. or combinations thereof. It is understood that light beams propagating along the optical axis contain rays of light propagating at an angle, e.g. an angle less than 45 degrees to the optical axis. The light collector may be configured to fill the optical the gate 1461 with light from the light sources 1403 so that the area, i.e. the aperture, of the optical gate 1461 is illuminated with a uniform intensity or optimized for max output. The optical gate 1461 is arranged along the optical axis 1407.

The optical assembly 1409 may be configured to collect at least a part of the light beams transmitted through the optical gate 1461 and to image the optical gate at a distance along the optical axis. For example, the optical assembly 1409 may be configured to image the optical gate 1461 onto some object such as a screen, e.g. a screen on a concert stage. A certain image, e.g. some opaque pattern provided on a transparent window, an open pattern in a non-transparent material, or imaging object such as GOBOs known in the field of entertainment lighting, may be contained within the gate 1461 so that that the illuminated image can be imaged by the optical projecting system. In the light fixture according to various embodiments the opaque pattern with a transparent window can be provided an iris diaphragm according to various embodiments as described in the previous figures. Accordingly, the light fixture 1401 may be used for entertainment lighting.

In the illustrated embodiment the light is directed along the optical axis 1407 by the light collector 1459 and passes through a number of light effects before exiting the light fixture through a front lens 1409a. The light effects can for instance be any light effects known in the art of intelligent/ entertainments lighting for instance, a CMY color mixing system 1465, color filters 1467, gobos 1469 animation effects 1471, a iris diaphragm system, 114, a focus lens group 1409c, zoom lens group 1409b, prism effect 1473, framing effects (not shown), or any other light effects known in the art. The mentioned light effects only serves to illustrate the principles of an illuminating device for entertainment lighting and the person skilled in the art of entertainment lighting will be able to construct other variations with additional are less light effects. Further it is noticed that the order and positions of the light effects can be changed. The iris diaphragm 111 is illustrated as the iris diaphragm shown in FIG. 1 and similar features are labeled with the same reference numbers as in FIG. 1. The iris diaphragm comprises thus at least one shutter blade formed as a flat opaque surface the shutter blade comprises a comprising a diaphragm edge, where the diaphragm edges of the shutter blades form a diaphragm aperture inside the stationary ring and rotation of the adjusting ring moves shutter blades inside the stationary ring. At least one of the shutter blades comprises at least one transparent region formed in the opaque flat surface and at least one transparent region can be arranged inside the stationary ring.

Figure 15:
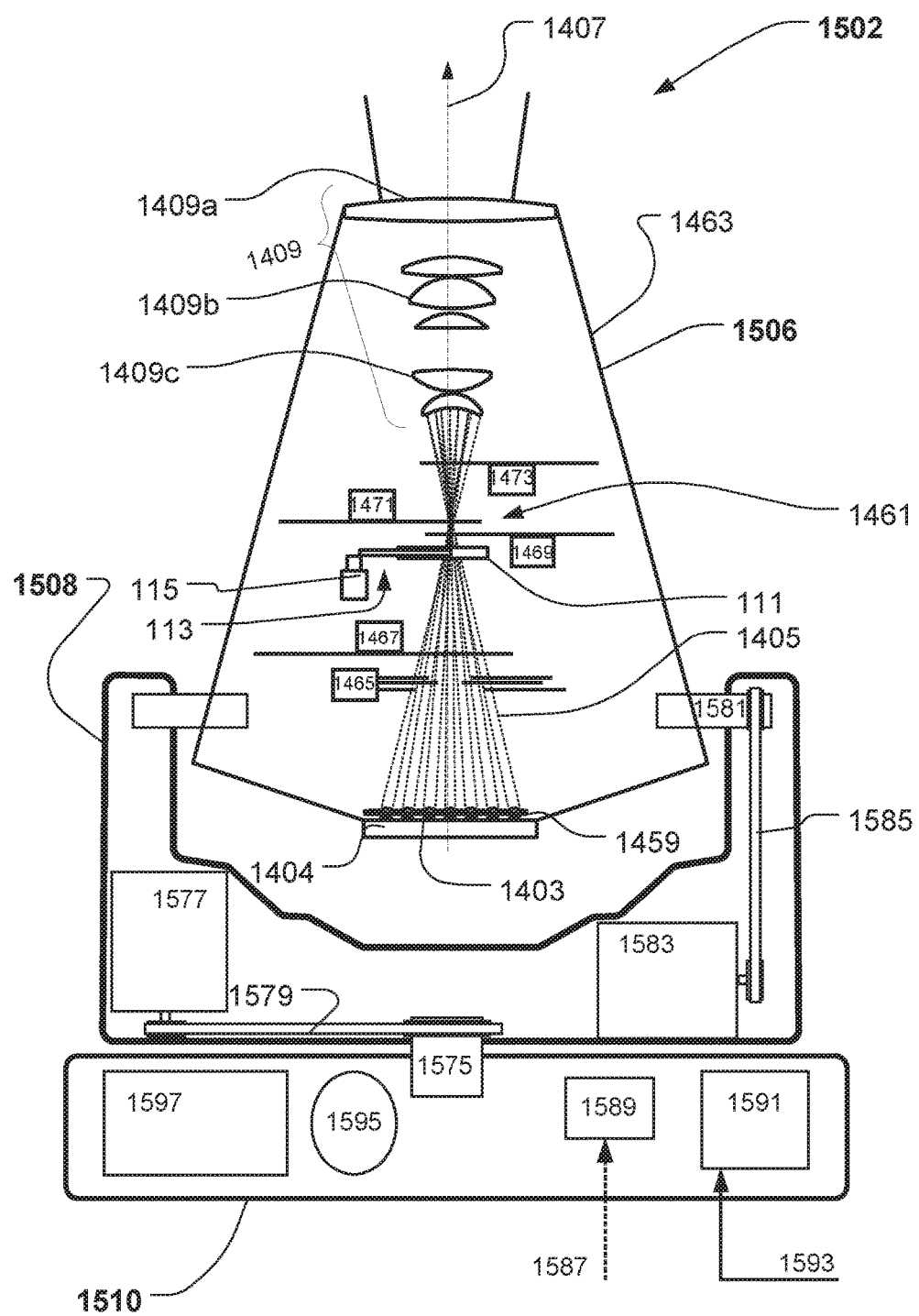
FIG. 15 illustrates a structural diagram of a moving head light fixture comprising an iris diaphragm according to various embodiments.

FIG. 15 illustrates a structural diagram of a moving head light fixture 1502 comprising a head 1506 rotatable connected to a yoke 1508 where the yoke is rotatable connected to a base 1510. The head is substantially identical to the light fixture shown in FIG. 14 and substantial identical features are labeled with the same reference numbers as in FIG. 14 will not be described further. The moving head light fixture comprises pan rotating means for rotating the yoke in relation to the base, for instance by rotating a pan shaft 1575 connected to the yoke and arranged in a bearing (not shown) in the base). A pan motor 1577 is connected to the pan shaft 1575 through a pan belt 1579 and is configured to rotate the shaft and yoke in relation to the base through the pan belt. The moving head light fixture comprises tilt rotating means for rotating the head in relation to the yoke, for instance by rotating a tilt shaft 1581 connected to the head and arranged in a bearing (not shown) in the yoke). A tilt motor 1583 is connected to the tilt shaft 1581 through a tilt belt 1585 and is configured to rotate the shaft and head in relation to the yoke through the tilt belt. The skilled person will realize that the pan and tilt rotation means can be constructed in many different ways using mechanical components such as motors, shafts, gears, cables, chains, transmission systems, bearings etc. Alternatively it is noticed that it also is possible to arrange the pan motor in the base and/or arrange the tilt motor in the head.

As known in the prior art the moving head light fixture receives electrical power 1587 from an external power supply (not shown). The electrical power is received by an internal power supply 1589 which adapts and distributes electrical power through internal power lines (not shown) to the subsystems of the moving head. The internal power system can be constructed in many different ways for instance by connecting all subsystems to the same power line. The skilled person will however realize that some of the subsystems in the moving head need different kind of power and that a ground line also can be used. The light source will for instance in most applications need a different kind of power than step motors and driver circuits.

The light fixture comprises also a controller 1591 which controls the components (other subsystems) in the light fixture based on an input signal 1593 indicative light effect parameters, position parameters and other parameters related to the moving head lighting fixture. The controller receives the input signal from a light controller (not shown) as known in the art of intelligent and entertainment lighting for instance by using a standard protocol like DMX, Art-NET, RDM etc. Typically the light effect parameter is indicative of at least one light effect parameter related to the different light effects in the light system. The controller 1591 is adapted to send commands and instructions to the different subsystems of the moving head through internal communication lines (not shown). The internal communication system can be based on a various type of communications networks/systems. It is noticed that the light fixture illustrated in FIG. 14 also comprise a controller configured to control the components of the light fixture.

The moving head can also comprise user input means enabling a user to interact directly with the moving head instead of using a light controller to communicate with the moving head. The user input means 1595 can for instance be bottoms, joysticks, touch pads, keyboard, mouse etc. The user input means can also be supported by a display 1597 enabling the user to interact with the moving head through a menu system shown on the display using the user input means. The display device and user input means can in one embodiment also be integrated as a touch screen.

The invention claimed is:

1. An iris diaphragm, comprising:
a stationary ring;
a rotatable adjusting ring; and
shutter blades that comprise an opaque flat surface having a diaphragm edge,
said diaphragm edges of said shutter blades forming a diaphragm aperture inside
said stationary ring,
wherein rotation of said rotatable adjusting ring moves said shutter blades inside said stationary ring, and
wherein at least one of said shutter blades comprises at least one transparent region formed in the opaque flat surface, wherein said at least one transparent region is larger than said opaque flat surface.

2. The iris diaphragm according to claim 1, wherein said at least one transparent region is arranged inside said stationary ring.

3. The iris diaphragm according to claim 1, wherein each one of a plurality of said shutter blades comprises at least one transparent region formed in the opaque surface and the plurality of said shutter blades are at least partially overlapping and the transparent regions of said plurality of shutter blades are configured to partially overlap inside said stationary ring, whereby a number of transparent regions are formed between said diaphragm aperture and said stationary ring.

4. The iris diaphragm according to claim 3, wherein said partially overlapping transparent regions form a peripheral light pattern around said diaphragm aperture.

5. The iris diaphragm according to claim 1, wherein said shutter blades are arranged in a merged setting, wherein each shutter blade is arranged below at least one neighboring shutter blade and above at least another neighboring shutter blade.

6. The iris diaphragm according to claim 1, wherein said at least one transparent region is smaller than and has substantially the same shape as an outer contour.

7. The iris diaphragm according to claim 1, wherein the at least one of said shutter blades has an arc shape, and said at least one transparent region also has an arc shaped.

8. The iris diaphragm according to claim 1, wherein the at least one of said shutter blades comprises a flat metal plate, and wherein said at least one transparent region comprises as an opening in said flat metal plate.

9. The iris diaphragm according to claim 1, wherein the at least one of said shutter blades comprises a transparent plate, and wherein said opaque region comprises a non-transparent coating.

10. The iris diaphragm according to claim 1, wherein said at least one transparent region comprises a color filter.

11. The iris diaphragm according to claim 1, wherein said shutter blades are arranged in a merged setting, wherein each shutter blade is arranged below at least one neighboring shutter blade and above at least another neighboring shutter blade.

12. The iris diaphragm according to claim 3, wherein said at least one transparent region imparts a peripheral light pattern around said diaphragm aperture.

13. A light fixture, comprising:
at least one light source configured to generate a light beam and an optical assembly configured to project at least a part of said light beam along an optical axis; and
an iris diaphragm, including:
a stationary ring,
a rotatable adjusting ring, and
shutter blades that comprise an opaque flat surface having a diaphragm edge, said diaphragm edges of said shutter blades forming a diaphragm aperture inside said stationary ring,
wherein rotation of said rotatable adjusting ring moves said shutter blades inside said stationary ring, and
wherein at least one of said shutter blades comprises at least one transparent region formed in the opaque flat surface, wherein said at least one transparent region is larger than said opaque flat surface, and
wherein said at least one iris diaphragm is arranged in said light beam between said light source and said optical assembly.

14. The light fixture according to claim 13, wherein said optical assembly is configured to provide an image of said at least one iris diaphragm along said optical axis.

15. The light fixture according to claim 13, further comprising:
an actuator; and
a coupling linkage connecting said at least one iris diaphragm and said actuator,
wherein said actuator is configured to rotate said adjusting ring, whereby said shutter blades move inside said stationary ring.

* * * * *